Oct. 5, 1943.  R. BERGER ET AL  2,331,164
APPARATUS FOR WASHING VEGETABLES
Filed Oct. 2, 1942  4 Sheets-Sheet 1

FIG. I.

INVENTORS:
RUDOLPH BERGER
HAROLD N. RICKET
BY Saywell and Wessler
ATTORNEYS

INVENTORS:
RUDOLPH BERGER
HAROLD N. RICKET

Oct. 5, 1943.  R. BERGER ET AL  2,331,164
APPARATUS FOR WASHING VEGETABLES
Filed Oct. 2, 1942  4 Sheets-Sheet 3

INVENTORS:
RUDOLPH BERGER
HAROLD N. RICKET

BY Saywell and Wesseler
ATTORNEYS.

Oct. 5, 1943.  R. BERGER ET AL  2,331,164
APPARATUS FOR WASHING VEGETABLES
Filed Oct. 2, 1942   4 Sheets-Sheet 4

INVENTORS:
RUDOLPH BERGER
HAROLD N. RICKET

BY Saywell and Wesseler
ATTORNEYS

Patented Oct. 5, 1943

2,331,164

UNITED STATES PATENT OFFICE 2,331,164

APPARATUS FOR WASHING VEGETABLES

Rudolph Berger and Harold N. Ricket, Amherst, Ohio, assignors to The American Specialty Company, Amherst, Ohio, a corporation of Ohio Application October 2, 1942, Serial No. 460,544

1 Claim. (Cl. 146—194)

The invention relates to improved apparatus for washing vegetables, the invention being particularly applicable to the washing of bunched vegetables. By the improved apparatus all kinds of bunched vegetables, such as bunches of radishes, carrots, beets, parsley, green onions, celery, etc., are efficiently washed, without injury to the leaves and stems of the bunched material. The washing is effected automatically, and without the necessity of experienced operators, and at a high rate of production.

The annexed drawings and the following description set forth in detail certain means exemplifying the invention, such drawings and description disclosing, however, only two of the various forms of apparatus in which the principle of the invention may be embodied.

Figures 6, 7, 8, 9:
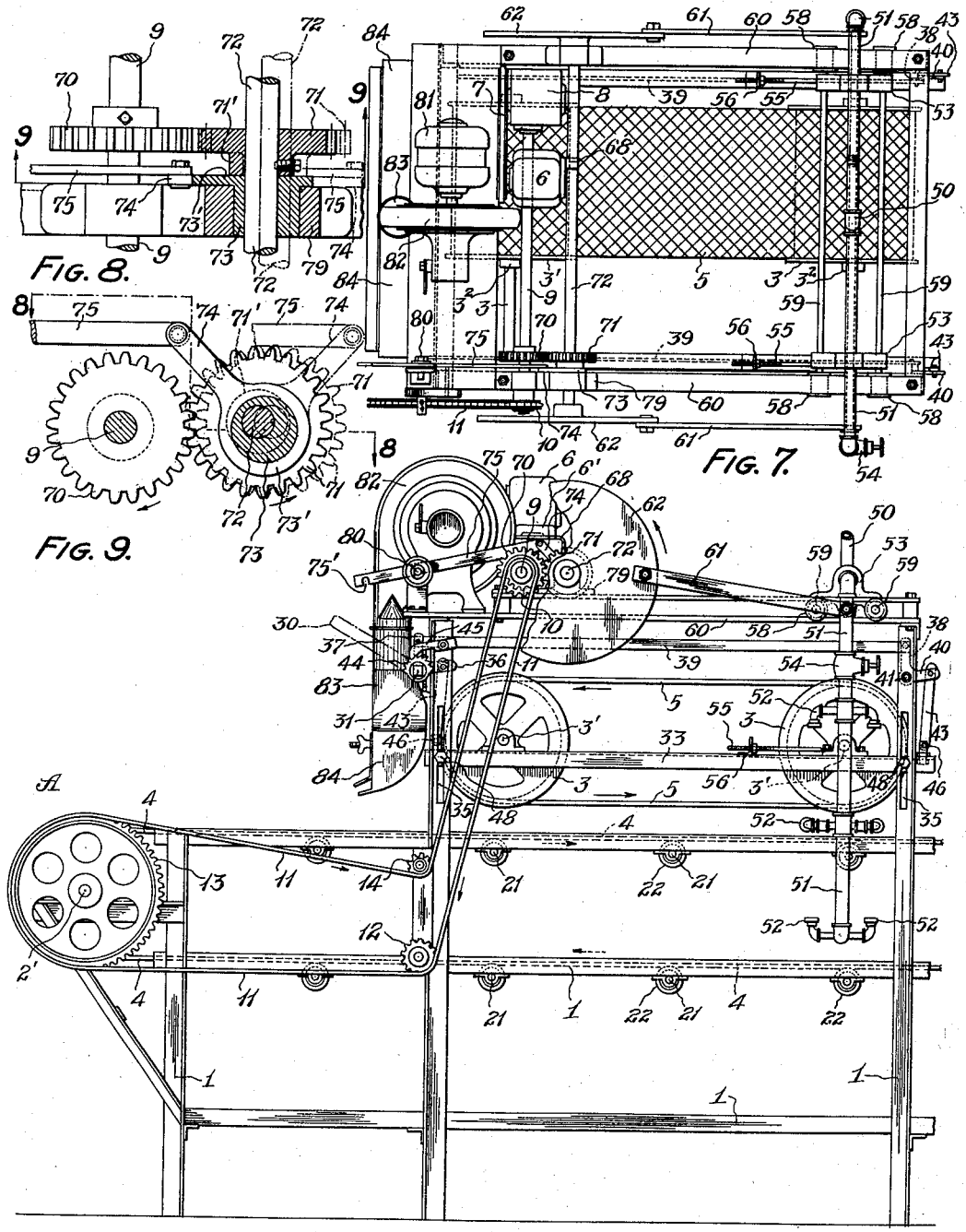
Figure 6 is a side elevation, partially broken away, of a portion of the right side, as viewed from the loading end A, of a modified form of the improved apparatus.
Figure 7 is a plan view of a portion of the apparatus shown in Figure 6.

Figure 8 is a fragmentary plan view and horizontal section, upon an enlarged scale, taken from the planes indicated by the line 8—8, Figure 9, a disconnected relation of certain gear and associated elements being indicated by broken lines; and Figure 9 is a fragmentary vertical longitudinal section, taken in the plane indicated by the line 9—9, Figure 8, the disconnected position of the gear and associated elements being indicated also in this figure by broken lines.

The improved apparatus is designed to spray vegetables with high-pressure water directed from various levels and angles while the vegetables are being carried forwardly in a continuous run of bunches upon a suitable conveyor. The stems and leaves of the bunched material are fairly securely but somewhat resiliently retained in position relatively to the conveyor, whereby the bunches are held in place on the conveyor, the roots of the bunched material being exposed to the full force of the water sprayed thereon while the leaves and stems are somewhat protected from the water pressure through the breaking up of the spray before it impinges thereon.

Figure 1:
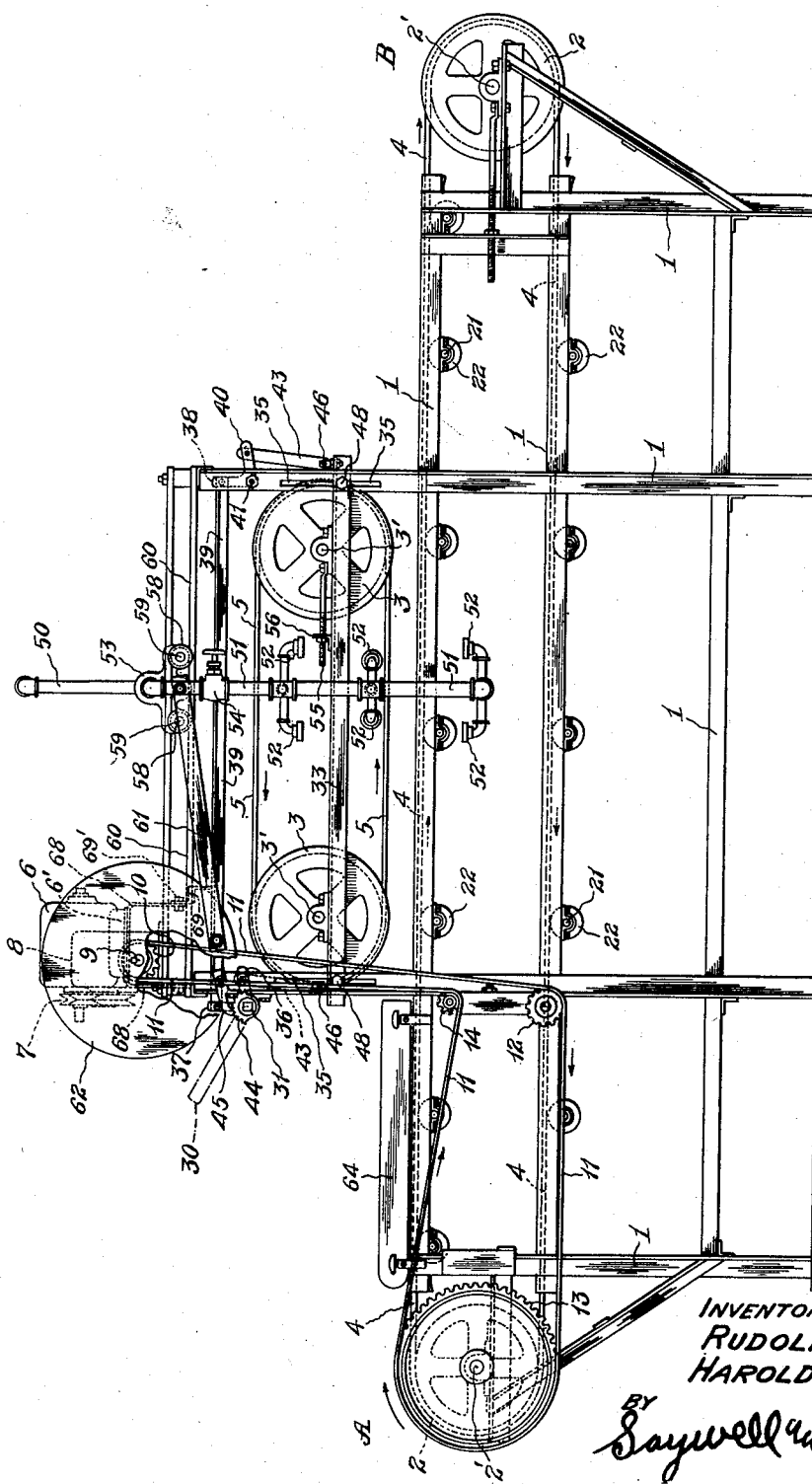
Figure 1 is a side elevation, partially broken away, of the improved vegetable-washing apparatus, the right side thereof as viewed from the loading end A of the apparatus.

Referring to the annexed drawings in which the same parts are indicated by the same respective numbers in the several views, and first referring particularly to the form of the invention shown in Figures 1 to 5, inclusive, the improved apparatus consists of a suitable skeleton frame 1 in which are mounted at different levels, upon respective transverse shafts 2' and 3', Figure 1, two pairs of spaced rolls 2 and 3 over which play spaced superposed endless formaminous conveyors 4 and 5, respectively, such conveyors being preferably formed from wire mesh. The lower conveyor 4, which is the load conveyor, runs over spaced rollers 22 journalled on shafts 21 mounted on the frame 1.

Figures 2, 3:
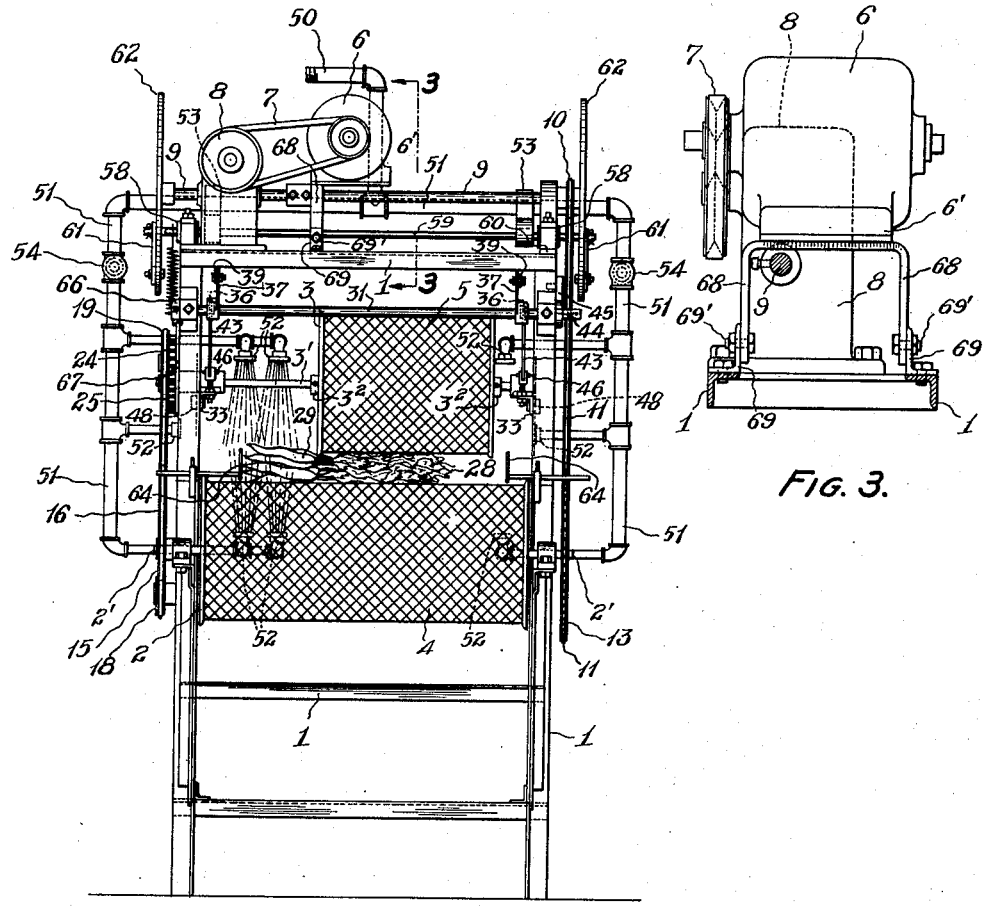
Figure 2 is an elevation of the loading end of the apparatus.
Figure 3 is a fragmentary vertical longitudinal section, upon an enlarged scale, taken in the plane indicated by the line 3—3, Figure 2.

A drive is derived from a motor 6, Figures 2 and 3, which through a belt 7 drives a gear reducing assembly 8. To one end of a driving shaft 9 extended outwardly from the gear reduction assembly 8 is secured a sprocket 10 engaged by an endless chain 11 which also engages a sprocket 13 mounted upon one end of the front conveyor shaft 2' to which the forward roll 2 of the lower conveyor 4 is secured, the endless chain 11 also engaging two idler sprockets 12 and 14 mounted upon the frame 1 intermediate the lower and upper parts respectively of the sprocket 13 and the sprocket 10. The drive is such that the direction of movement of the load conveyor 4 is as indicated in Figure 1.

Figures 4, 5:
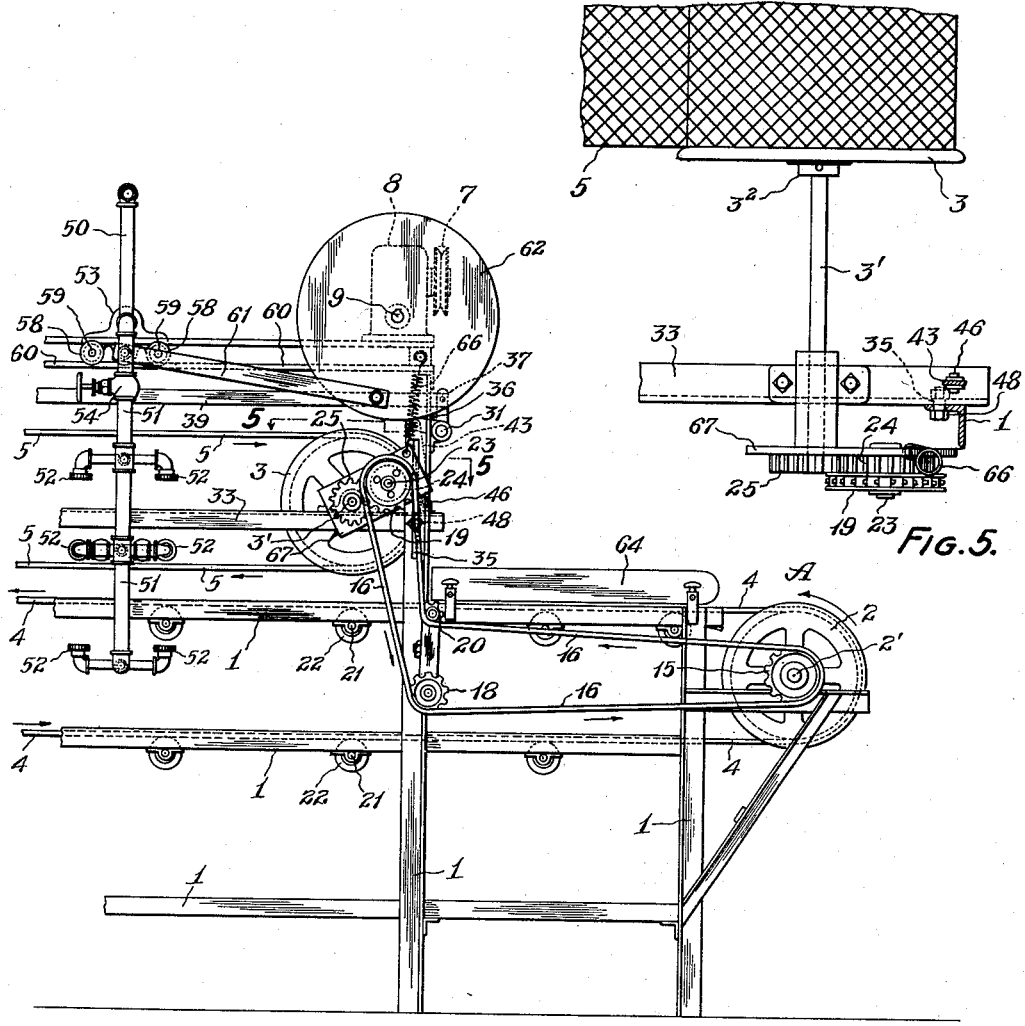
Figure 4 is an elevation of the front portion of the left side of the improved apparatus.
Figure 5 is a fragmentary horizontal section, upon an enlarged scale, taken in the planes indicated by the line 5—5, Figure 4.

Movement of the upper conveyor 5 is effected through an endless chain 16, Figure 4, which engages a sprocket 15 secured to the front conveyor shaft 2' and to the end thereof opposite the end to which the sprocket 13 is secured, this chain 16 engaging a sprocket 19 rotatably mounted upon a stub shaft 23, Figure 5, to which sprocket 19 is secured a gear 24 also rotatably mounted on the shaft 23 and engaging a gear 25 secured to the transverse shaft 3' to which the forward roll 3 for the upper conveyor 5 is secured. The chain 16 intermediate the sprocket 15 and the sprocket 19 engages idler sprockets 18 and 20, mounted on the frame 1.

The superposed conveyors 4 and 5 travel in substantially parallel planes and the lower load conveyor 4, in addition to being considerably longer to provide a loading zone A and an unloading zone B, is materially wider than the upper conveyor 5 so that there is a substantial overlapping of the upper conveyor 5 by the lower and load conveyor 4. As hereinafter fully described, the particular area by which the lower conveyor 4 overlaps the upper conveyor 5 can be varied through a lateral shifting of the upper conveyor 5 and one relative positioning of the two conveyors 4 and 5 is shown in the loading end elevation of the machine appearing in Figure 2.

The space between the upper run of the lower conveyor 4 and the lower run of the upper conveyor 5 is such as to accommodate the stems and leaves 28 of the bunches of vegetables to be washed, as clearly appears in Figure 2, the roots 29 of the bunches extending laterally of the upper conveyor 5 and resting upon an overlapping portion of the lower conveyor 4. The distance between the two conveyors 4 and 5 is so gauged as to cause the lower run of the upper conveyor 5 to hold the leaves and stems 28 to the upper run of the lower conveyor 4, this holding being a somewhat resilient one on the wire mesh material and not compressible enough to injure the leaves and stems 28. However, the holding of the stems and leaves 28 is sufficiently strong to retain the bunches in place on the lower conveyor 4.

In order that the space between the two conveyors 4 and 5 may be adjusted to accommodate different sizes of vegetable bunches and various degrees of pressure upon the leaves and stems 28, apparatus for effecting a vertical adjustment of the upper conveyor 5 is provided which can be actuated by any suitable hand tool, such as a wrench 30, suggested in Figure 1, having a square bore at one end adapted to engage a square section of a cross shaft 31 disposed adjacently the front roll 3, to each end of which cross shaft 31 is secured an angular member having a longitudinally-extended arm 36 and a vertically-extended arm 37. There are similar angular members rotatably mounted on pins 41 secured to the frame 1 adjacent the rear roll 3 and having longitudinally-extended arms 40 and vertically-extended arms 38. The respective pairs of arms 37—38 are pivotally secured to the respective ends of longitudinal angles 39. The respective arms 36 and 40 are pivotally connected to downwardly-extended bars 43 which are secured by bolts 46 to longitudinal angles 33 upon which the rolls 3 for the upper conveyor 5 are mounted. Vertical angle bars of the frame 1 guide the longitudinal angles 33 by means of bolts 48 which pass through slots 35 formed in said vertical angles of the frame 1, these slots 35 being elongated vertically to provide for the vertical adjustment of the angles 33. It is evident that the actuation of the shaft 31 by the wrench 30 will effect the raising or lowering of the longitudinal angles 33 whereby the height of the upper conveyor 5 can be adjusted. Secured to the shaft 31 is a ratchet segment 44 engaged by a pawl 45 pivotally secured to the frame 1 whereby the longitudinal angles 33 and hence the upper conveyor 5 may be retained at any desired height to which it is adjusted by the wrench 30 and cooperating mechanism just described.

As the bunched vegetables are moved forwardly on the conveyor 4 they are washed by water sprayed from a plurality of nozzles 52 mounted upon feed headers 51 and so distributed as to spray the wash water upon the vegetable bunches at different angles and from different levels. The feed headers 51 which are mounted on blocks 53 extend upon both sides of the machine so as to spray two series of vegetable bunches being conveyed upon the two respective sides of the machine, if desired, these feed headers 51 being supplied with washing liquid through a main inlet pipe 50 connected in any suitable manner with a source of supply water (not shown). Control valves 54 are provided for each of the feed headers 51 in order that the spraying may be effected on either side of the machine or concurrently on both sides, according to whether one or two runs of bunches are being treated simultaneously. There is illustrated in Figure 2 the treatment of one run of bunches, presumably bunches of the larger sizes, and the conveyors 4 and 5 are relatively arranged for the most effective treatment of such larger bunches, the spraying being effected from the header 51 and the series of nozzles 52 associated therewith on one side of the apparatus only.

Inasmuch as the roots 29 of the bunches are substantially entirely exposed and since the nozzles 52 discharge both upon the bottom and the top of the bunched roots and onto the sides thereof, the roots 29 are given a very thorough and uniform washing treatment. Some of the water is also sprayed upon the leaves and stems 28, thereby also washing and rinsing them but, inasmuch as the leaves and stems 28 are somewhat closely confined between the conveyors 4 and 5, and inasmuch as the wire mesh of the lower run of the upper conveyor 5 and the wire mesh of the upper run of the lower conveyor 4 break up the direct spray, the leaves and stems 28 are not injured by the water pressure. The pressure utilized for spraying the water may be quite high, if desired; up to 400 pounds per square inch.

A pair of transversely adjustable and longitudinally-extending guides 64 are provided at the loading end A of the machine adjacently above the upper run of the lower conveyor 4 for assistance in properly positioning upon said conveyor 4 the bunches of vegetables to be washed.

The machine is designed repeatedly to spray the vegetable bunches from the front and from the rear and from all angles between the front and rear as the bunches pass through that section of the path of travel of the conveyors which is substantially comprehended between the lower conveyor 4 and the upper conveyor 5. For this purpose, the feed headers 51 are reciprocated longitudinally of the machine at a high speed as compared to the rate of travel of the conveyors 4 and 5 and for effecting this result the blocks 53 for the feed headers 51 each have a pair of rollers 58 engaging longitudinally from angles 60, the respective pairs of laterally opposed rollers 58 being rotatably mounted on cross shafts 59. These roller blocks 53 are reciprocated by pitmans 61 secured at one end thereto and eccentrically at their other ends to disks 62 secured to and adjacent the ends of the driving shaft 9. The several transmission members are so designed that actuation of the roller blocks 53 due to rotation of the disks 62 causes said blocks to travel materially faster than the rate of travel of the conveyors 4 and 5 and to reciprocate the feed headers 51 and hence the nozzles 52 several times while the conveyors 4 and 5 are passing through the spraying area.

When the upper conveyor 5 is vertically adjusted, it is desirable to insure a taut condition of its driving chain 16. To this end, the stub shaft 23, Figures 4 and 5, upon which the sprocket 19 and the gear 24 are rotatably mounted is mounted in a plate 67 which is pivotally mounted adjacent one end on and adjacent one end of the roll shaft 3'. The upper corner of the opposite end of the plate 67 is held in its uppermost position by a vertically-disposed spring 66 secured thereto adjacent its bottom end and secured at its opposite end to the frame 1. Hence, dependent upon the height of the gear 25 which is determined by the height to which the upper conveyor 5 has been adjusted, the gear 24 will ride upon the gear 25 under the pull of the spring 66 which determines the elevation of the one end of the plate 67 and hence of the sprocket 19 which will thus retain the driving chain 16 in suitably taut condition.

The motor 6 is so mounted as to act as a tightener for the belt 7, Figures 2 and 3. This function of the motor 6 is attained by mounting the base 6' of the motor 6 on the top of an inverted U-shaped strap bracket 68 whose opposed legs are pivotally mounted adjacent their lower ends upon pins 69' which intersect the legs of the bracket 68 and vertically-extended flanges of angles 69 secured by horizontal flanges to the top of the frame 1. Inasmuch as the base 6' of the motor 6 is mounted upon the strap bracket 68 adjacent its edge which lies nearest the belt 7, the weight of the motor 6 tends to depress its free edge and thus the motor 6 acts as a means to hold the belt 7 taut.

As is clearly apparent in Figures 2 and 5, the rolls 3 are formed with end hubs $3^2$ adapted to be detachably secured to the shafts 3' whereby the rolls 3 and, hence, the upper conveyor 5 can be laterally shifted to any desired position relative to the load conveyor 4. Thus, accommodation is provided for a washing zone confronting the overlapping portion of the load conveyor 4 as is suitable for the size and character of material being washed. Also, as is clearly apparent in Figure 1, from the threaded bolts 55 and the angles 56 engaged thereby and mounted on the longitudinal angles 33, one of the rolls 3—the rear one, as shown in Figure 1— is longitudinally adjustable upon the frame angles 33 whereby to insure the proper tensioning of the upper conveyor 5.

The nature of the material to be washed and its condition as to loose stems and other refuse are often such as to make advisable a simple washing of the material without repeated spraying thereof from various angles.

Hence, in the form of apparatus shown in Figures 6, 7, 8, and 9, provision is made for disconnecting the feed headers 51 so as to eliminate the rapid reciprocations thereof. The assembly for effecting this purpose is obtained by securing a gear 70 on the driving shaft 9 and providing a separate shaft 72 for turning the disks 62 and securing to this shaft 72 a gear 71 adapted to engage the gear 70 and of equal size to the latter. Thus, when the gears 70 and 71 are engaged, the operation is the same as before explained with reference to Figures 1, 2, 3, 4, and 5 and the feed headers 51 are rapidly reciprocated. For eliminating the reciprocating movements of the feed headers 51, the shaft 72, gear 71, and reciprocating disks 62 and pitmans 61 are disconnected from the driving shaft 9. This disconnection is effected by disengaging the gears 70 and 71. The structure for effecting this purpose is as follows: The gear 71 has a hub 71' which is secured to the shaft 72 and abuts a flange 73' of a bearing 73 in which the shaft 72 is eccentrically disposed. This bearing 73 is journalled in a frame block 79 and its flange 73' has a forwardly-extended arm 74 whose outer end is pivotally secured to an operating link 75. Therefore, if the link 75 is actuated from the full line position shown in Figure 9, which is an engaged position of the gears 70 and 71, to the dot-and-dash position shown in said figure, the turning in the frame block 79 of the bearing 73 and the shaft 72 which is eccentrically mounted therein will disengage the gears 70 and 71 by moving the shaft 72 and hence the gear 71 to the dot-and-dash positions shown in Figure 9. The consequent slight repositioning of the far end of the shaft 72 is accommodated by a somewhat loose mounting thereof in its bearing block. Notches 75' formed in the lower edge of the link 75 and a cooperating pin 80 mounted on the frame 1 serve to hold the link 75 in the desired position for engagement or disengagement of the gears 70 and 71.

The aforementioned condition as to loose refuse associated with the material to be washed often makes advisable an air cleaning action upon the material at the loading end A of the machine, and to this end a blower 82, Figures 6 and 7, is mounted upon top of the machine adjacent the loading end A, which blower 82 is operated by a motor 81 and has a downwardly-extended outlet duct 83 the exhaust from which plays over the transverse dimension 84 of the upper run of the load conveyor 4 upon which the material to be treated is being placed.

What we claim is:

Apparatus for washing vegetables comprising two relatively spaced and substantially parallel foraminous belts, a motor and gearing for driving the belts in the same direction, a spraying assembly having a reciprocatory path of movement along a given section of the path of travel of the belts, driving means for the spraying assembly for reciprocating the latter at a speed of movement greatly in excess of the speed at which the belts are moved, said last-mentioned driving means including a gear actuated by the belt drive, a second gear engageable thereby and an eccentric mounting therefor, means for actuating said mounting for displacing the last-mentioned gear either for connection of the spraying assembly drive with the belt drive or disconnection thereof, spraying devices forming a part of the spraying assembly and directed toward said section of the path of travel of the belts, and a frame upon which the aforementioned elements are mounted.

RUDOLPH BERGER.
HAROLD N. RICKET.